(No Model.)

W. H. BACHTEL.
Manufacture of Coffins of Clay or other Plastic Material.

No. 238,268.  Patented March 1, 1881.

Witnesses:
H. C. McArthur.
Alex. Scott

Inventor:
William H. Bachtel,
per Chas. H. Fowler
Attorney.

UNITED STATES PATENT OFFICE.

WILLIAM H. BACHTEL, OF CANTON, OHIO.

MANUFACTURE OF COFFINS OF CLAY OR OTHER PLASTIC MATERIAL.

SPECIFICATION forming part of Letters Patent No. 238,268, dated March 1, 1881.

Application filed February 3, 1881. (No model.)

*To all whom it may concern:*

Be it known that I, WILLIAM H. BACHTEL, a citizen of the United States, residing at Canton, in the county of Stark and State of Ohio, have invented certain new and useful Improvements in Manufacture of Coffins, &c., of Clay or other Plastic Material; and I do hereby declare that the following is a full, clear, and exact description of the same, reference being had to the annexed drawings, making a part of this specification, and to the letters and figures of reference marked thereon.

The present invention has relation to the manufacture of coffins, burial-caskets, or vaults of clay or other similar plastic material; and it consists in forming the main portions or body thereof porous and the exterior surface glazed, as will be hereinafter more fully described.

Figure 1:
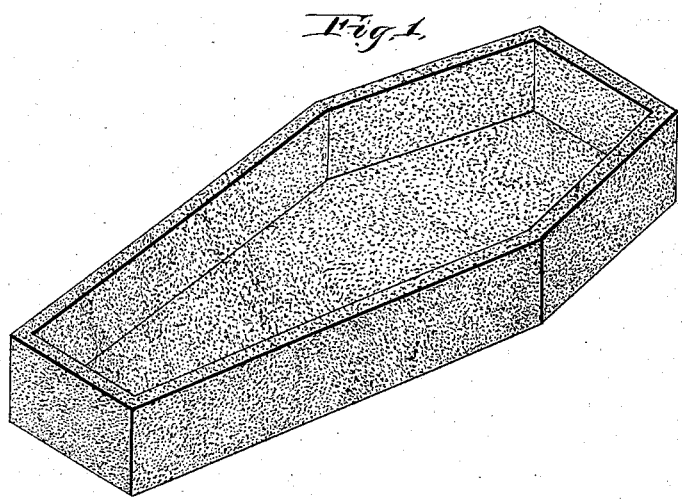
Figure 2:
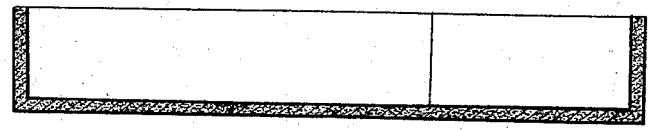

Figure 1 of the drawings is a perspective view of a coffin of clay or other plastic material previous to its being glazed; and Fig. 2 is a longitudinal vertical section thereof, showing it glazed upon its inner and outer surfaces.

In the manufacture of the coffin, burial-casket, or vault the clay is first reduced by grinding to the required consistency to be worked into shape by the hands or a suitable machine. It is preferred to first form the clay into slabs of the required size and shape, and afterward put them together; or, if found desirable, they may be formed or pressed into shape by the employment of suitable dies. When the clay is being ground I mix with it ground charcoal, coal-dust, sawdust, tan-bark, or other like substance that will readily consume by the action of heat, so that when the coffin, burial-casket, or vault is being burned in a suitable kiln, the body thereof will be left porous by the fine particles introduced in the clay being destroyed.

If desired, the ground charcoal or other substance, hereinbefore referred to, may be pressed or rolled into the slabs of clay before being placed together; or, in place of introducing the fine particles of charcoal or like substance, the surface of the clay may be covered with perforations or small pin-holes, this being accomplished by passing the clay between two perforating-rollers, or by any other suitable means found best adapted to the purpose.

By this means I am enabled to produce a coffin, burial-casket, or vault that will be much lighter and more easily handled than those composed simply of baked or burned clay.

The coffin, burial-casket, or vault after being burned, and while hot, is glazed upon its surface. Either a salt or slip glaze, or any ornamental glaze of vitrifiable qualities, may be used, as I do not desire to confine myself to any particular manner or process of glazing the surface or the ingredients used in the glaze.

I would further desire it to be understood that I do not confine my invention to any special form or design of coffin, burial-casket, or vault, or to any special means of rendering the clay porous, as it is evident that it may be accomplished in many ways that will effect the object sought—that of obtaining great lightness, which is the essential feature of my invention.

Having now fully described my invention, what I claim as new, and desire to secure by Letters Patent, is—

As a new article of manufacture, a coffin, burial-casket, or vault composed of clay or other similar plastic material, the main portions or body of which is made porous and glazed in any suitable manner, substantially as and for the purpose set forth.

In testimony that I claim the above I have hereunto subscribed my name in the presence of two witnesses.

WILLIAM H. BACHTEL.

Witnesses:
JNO. J. CHAPMAN,
H. J. ENNIS.